United States Patent

[11] 3,593,745

[72] Inventor Ned C. Myers
 Elkhart, Ind.
[21] Appl. No. 831,044
[22] Filed June 6, 1969
[45] Patented July 20, 1971
[73] Assignee Robershaw Controls Company
 Richmond, Va.

[54] PNEUMATICALLY OPERATED VALVE MEANS AND PARTS THEREFOR OR THE LIKE
 5 Claims, 7 Drawing Figs.
[52] U.S. Cl. ................................................. 137/625.4,
 137/625.5
[51] Int. Cl. ...................................................... F16k 11/04
[50] Field of Search ........................................... 137/625.5,
 625.4

[56] References Cited
 UNITED STATES PATENTS
 828,086 8/1906 Bowers ........................ 137/625.4
 2,353,765 7/1944 Mathisen ..................... 137/625.5 X

| 2,892,608 | 6/1959 | Collins | 137/625.5 X |
| 3,122,065 | 2/1964 | Laun | 137/625.5 X |
| 3,188,048 | 6/1965 | Sutherland | 137/625.5 X |
| 3,329,165 | 7/1967 | Lang | 137/625.5 |
| 3,509,954 | 5/1970 | Sramcik | 251/63.6 X |

FOREIGN PATENTS
 483,764 8/1953 Italy ........................... 137/625.5
 1,064,000 8/1959 Germany ................... 137/625.5

Primary Examiner—M. Cary Nelson
Assistant Examiner—Michael O. Sturm
Attorneys—Auzville Jackson, Jr., Robert L. Marben and Candor, Candor & Tassone ABSTRACT: A pneumatically operated valve means having a housing means provided with two separate inlets and one outlet, the housing means having two spaced-apart and axially aligned valve seats respectively leading from the inlets to the outlet. A valve member is carried by the housing means and is disposed between the valve seats to respectively open and close the same in an alternate manner as the valve member is axially moved between its operating positions by pneumatically operated actuator means carried by the housing means.

PATENTED JUL 20 1971
3,593,745
SHEET 1 OF 2
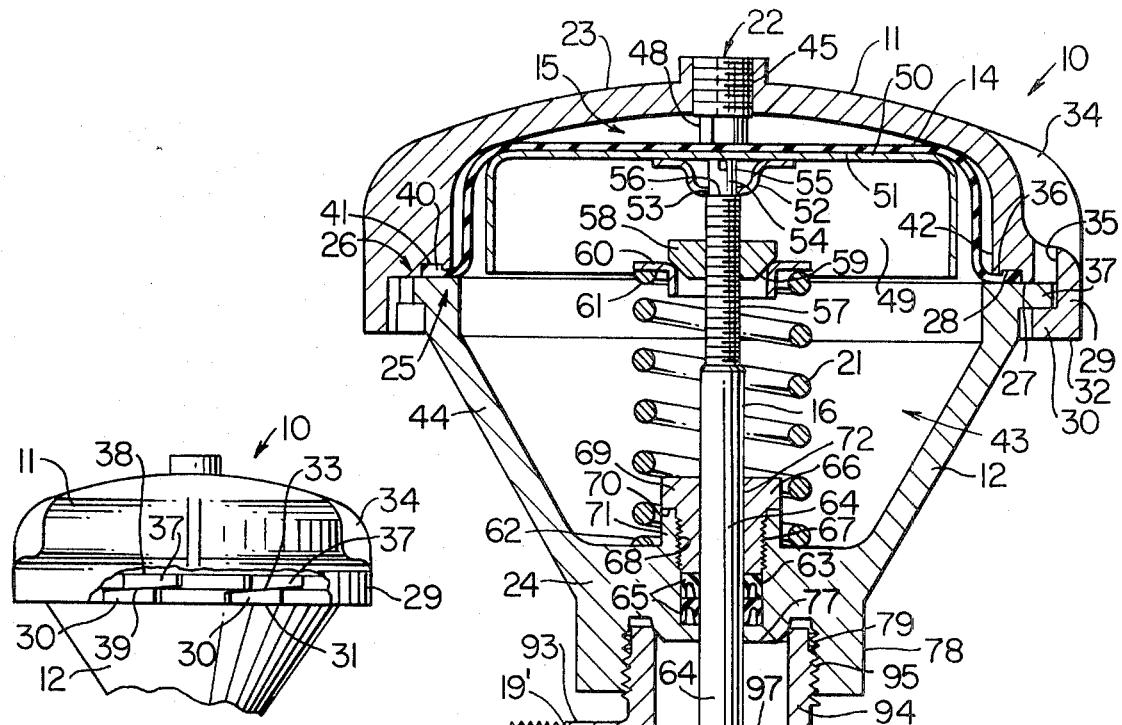
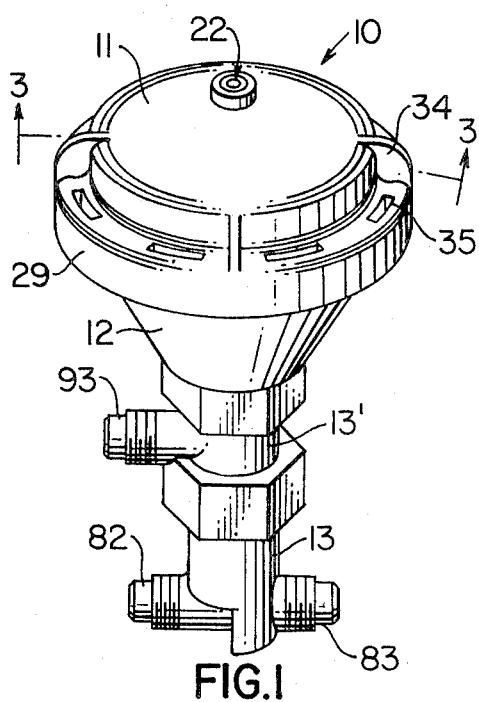
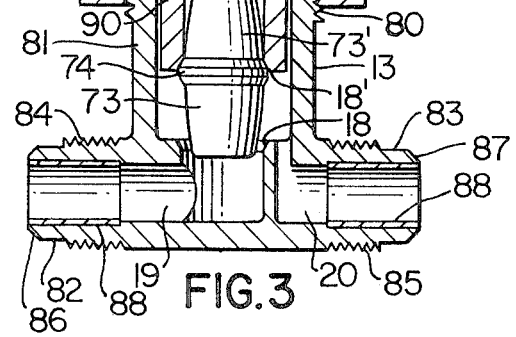
INVENTOR.
NED C. MYERS
BY
Caudn, Caudn & Tasorne
HIS ATTORNEYS

INVENTOR.
NED C. MYERS

HIS ATTORNEYS

PNEUMATICALLY OPERATED VALVE MEANS AND PARTS THEREFOR OR THE LIKE

This invention relates to an improved pneumatically operated valve means as well as to improve parts for such a pneumatically operated valve means or the like.

It is well known that pneumatically operated valve means have been provided in the past wherein a valve member is normally maintained in one position relative to a valve seat means when no pneumatic signal is being directed to such device, the valve member moving to another operating position when a pneumatic signal is being directed to such device.

One of the features of a copending patent application Ser. No. 831,043, filed June 6, 1969, filed concurrently herewith is to improve upon such structure by making the various parts from one piece molded plastic members that can be readily assembled together in an easy and effective manner.

However, one of the features of this invention is to provide improved valve seat means for such pneumatically operated valve means as disclosed and claimed in the aforementioned copending patent application so as to permit the same to control two inlets in connection with one outlet by utilizing a unique valve seat fitting of this invention.

In particular, one embodiment of this invention provides a housing means having two separate inlets and one outlet, the housing means having two spaced apart and axially aligned valve seats respectively leading from the inlets to the outlet. An axially movable valve member is carried by the housing means and is disposed between the valve seats to respectively open and close the same in an alternate manner in response to the operating condition of a pneumatically operated actuator means carried by the housing means and being operatively associated with the valve member to cause axial movement thereof between its operating positions.

Accordingly, it is an object of this invention to provide an improved pneumatically operated device having one or more of the novel features set fort above or hereinafter shown or described.

Another object of this invention is to provide improved parts for such a pneumatically operated device or the like.

Other objects, uses and advantages of this invention are apparent from a reading of this description which proceeds with reference to the accompanying drawings forming a part thereof and wherein:

FIG. 1 is a top perspective view of the improved pneumatically operated device of this invention.

FIG. 2 is a fragmentary side view of the device of FIG. 1 with a portion thereof broken away to illustrate the cam locking means of this invention.

FIG. 3 is an enlarged cross-sectional view taken on line 3—3 of FIG. 1.

Figure 6:
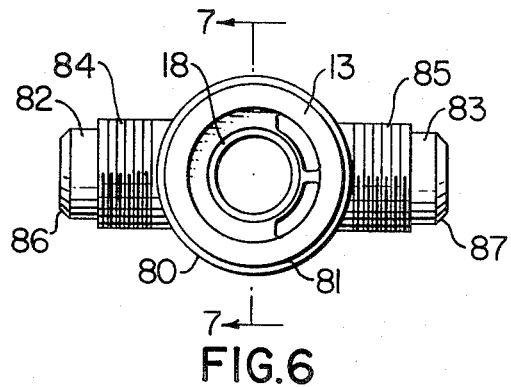
FIG. 6 is a top view of the valve seat means of FIG. 5.
Figure 5:
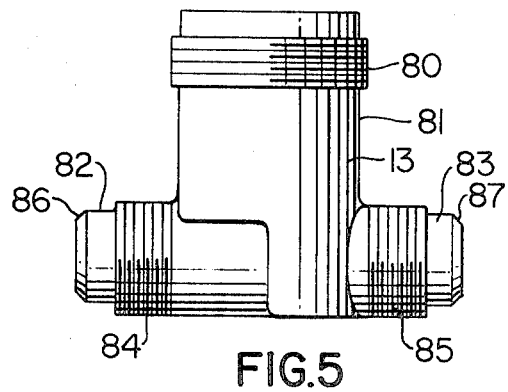
FIG. 5 is a side view of the valve seat means of this invention.

While the various features of this invention are hereinafter described and illustrated as being particularly adapted to provide a pneumatically operated valve means, it is to be understood that the various features of this invention can be utilized singly or in any combination thereof to provide other types of pneumatically operated devices as desired.

Therefore, this invention is not to be limited to only the embodiments illustrated in the drawings, because the drawings are merely utilized to illustrate one of the wide variety of uses of this invention.

Referring now to FIGS. 1—3, the improved pneumatically operated valve means of this invention is generally indicated by the reference numeral 10 and comprises two cup-shaped housing members 11 and 12 detachably secured together in the manner hereinafter described, valve seat means or fittings 13 and 13' being detachably secured to the housing member 12.

A flexible diaphragm 14 is carried by the housing members 11 and 12 in a manner hereinafter described to cooperate with the housing member 11 to define a chamber 15 therebetween, the flexible diaphragm 14 cooperating with a valve stem 16 having a valve head 17 on the lower end thereof that is adapted to open and close a valve seat 18 provided in the valve seat fitting 13 and separating an inlet passage means 19 from an outlet passage means 20.

Figure 4:
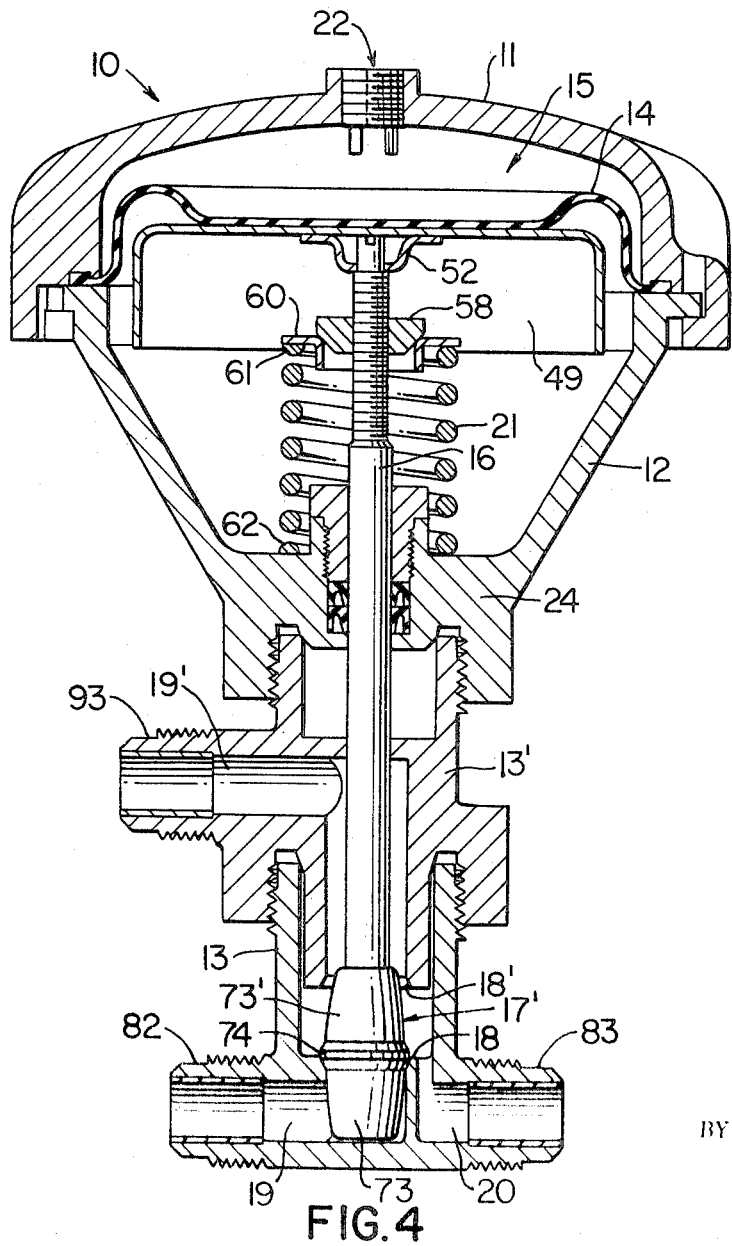
FIG. 4 is a view similar to FIG. 3 and illustrates the pneumatically operated device in another operating position thereof.
Figure 7:
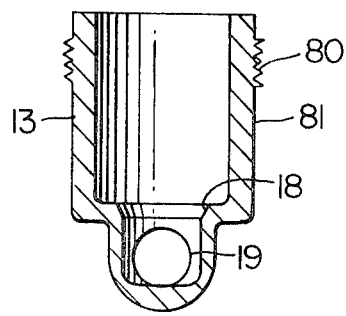
FIG. 7 is a cross-sectional view taken on line 7—7 of FIG. 6.

A compression spring 21 normally tends to maintain the flexible diaphragm 14 in the deactuated position of FIG. 3 wherein the valve head 17 is disposed in its open position so that fluid flow is permitted between the inlet means 19 and the outlet means 20. However, when a pressure fluid source (not shown) is directed to an opening means 22 formed in the cup-shaped housing member 11 in a manner hereinafter described to pressurize the chamber 15 of the device 10, the flexible diaphragm 14 is moved downwardly as illustrated in FIG. 4 by the resulting pressure differential across the diaphragm 14 in opposition to the force of the compression spring 21 to seat the valve head 17 against the valve seat 18 and thereby prevent fluid communication between the inlet means 19 and the outlet means 20. However, such downward movement of the valve head 17 opens valve seat 18' of the valve seat means or fitting 13' to interconnect the inlet 19' to the outlet 20.

The cup-shaped housing members 11 and 12 can each be formed as a molded one piece plastic structure in the configuration illustrated in the drawings whereby the cup-shaped housing members 11 and 12 respectively have closed ends 23 and 24 and open ends 25 and 26.

The open end 25 of the cup-shaped housing member 11 is defined by an annular flat surface 27 having an annular groove 28 provided therein. An annular depending flange 29 is integrally formed at the open end 25 of the cup-shaped housing member 11 outboard of the flat surface 27 thereof and carries a plurality of inwardly directed wedge-shaped cam members 30 which have their lower surfaces 31 coplanar with the lower end 32 of the annular flange 29 and their upper surfaces 33 angularly disposed relatively to the horizontal as illustrated in FIG. 2.

The annular flange 29 of cup-shaped housing member 11 is reinforced by a plurality of spaced and integral rib means 34 as illustrated in FIGS. 1—3. However, in order to insure flexibility of the annular flange 29 adjacent each cam or wedge member 30 thereof, opening means or slots 35 are formed through the cup-shaped housing member 11 in a manner to interrupt the flat surface 27 thereof above each cam member 30 as illustrated in FIG. 3 for a purpose hereinafter described.

The open end 26 of the other cup-shaped housing member 12 is also provided with a flat annular surface 36 and a plurality of spaced outwardly directed cam locking means or wedge members 37 each having an upper surface 38 disposed coplanar with the flat end surface 36 and with a lower annular surface 39 that cooperates with the angular surface 33 of a cam member 30 on the housing member 11 in a manner now to be described.

The spacing between each pair of wedge members 37 on the housing member 12 is of a dimension to respectively permit a wedge member 30 of the housing member 11 to be inserted therethrough when aligned therewith. Likewise, the spacing between adjacent wedge members 30 of the housing member 11 is such that a wedge member 37 of the housing member 12 can be inserted therethrough when aligned therewith.

In this manner, when it is desired to assemble the cup-shaped housing members 11 and 12 together, the assembler places the open end 25 and 26 of the housing members 11 and 12 together and rotates one of the housing members 11 and 12 relative to the other whereby the cam members 37 of the housing member 12 become aligned with the spacings between the cam members 30 of the housing member 11 so that they can be inserted therethrough in telescopic relation and subsequently be moved relative thereto whereby the cooperating slanting surfaces 33 and 39 wedged together as illustrated in FIG. 2 to firmly compress the flat end surfaces 27 and 36 of the housing members 11 and 12 together in a simple and effective manner.

The flexible diaphragm 14 has an outer peripheral means 40 defined by an annular bead 41 which is adapted to be received in the annular groove 28 in the flat end surface 27 of the housing member 11, the flat end surface 27 being relieved between the annular groove 28 and the interior peripheral surface 42 thereof to accommodate the thickness of the flexible diaphragm 14 inboard of the annular bead 41 thereof so tat the compressed relation between the open ends 25 and 26 of the housing members 11 and 12 through the cam locking means 30 and 37 thereof will not cause a cutting into or adverse effect on the flexible diaphragm 14 inboard of the annular bead 41 thereof.

In this manner, it can be seen that when the outer peripheral means 40 of the flexible diaphragm 14 is disposed between the open ends 25 and 26 of the housing members 11 and 12 when the same are being assembled together in the manner set forth above, the resulting compressed relation between the flat end surfaces 27 and 36 of the housing members 11 and 12 likewise compresses the outer peripheral means 40 of the flexible diaphragm 14 therebetween to insure a positive sealing relationship therebetween whereby the flexible diaphragm 14 is secured to the housing members 11 and 12 and effectively seals the pneumatic signal receiving chamber 15 between the flexible diaphragm 14 and the housing member 11 from a chamber 43 defined between the flexible diaphragm 14 and the end wall 24 of the cup-shaped housing member 12. However, the chamber 43 is adapted to be interconnected to the atmosphere in any suitable manner, such as by an opening means (not shown) passing through the frustoconical sidewall means 44 of the housing member 12 so as to prevent a dash pot effect of the chamber 43 in retarding movement of the flexible diaphragm 14 between its operating positions of FIGS. 3 and 4.

The end wall 23 of the housing member 11 is provided with a threaded bore 45 passing centrally therethrough and receives an externally threaded member 46 having the opening 22 passing therethrough, the lower end 47 of the member 46 having spaced abutment means 48 extending therefrom to space the diaphragm 14 from the passage means 22 and thereby eliminate upward movement of the diaphragm 14 to the position illustrated in FIG. 3 for a purpose hereinafter described.

A cup-shaped rigid diaphragm backing member 4 is adapted to have its closed end wall 50 abut against the under side 51 of the flexible diaphragm 14 in the manner illustrated in FIG. 3 and carries a small cup-shaped member 52 having an opening 53 passing therethrough and telescopically receiving a reduced end portion 54 of the valve stem 16 therethrough whereby the end 55 of the valve stem 16 abuts against the cup-shaped backing member 49 and the cup-shaped retainer 52 bears against a shoulder means 56 of the valve stem 16. The shoulder means 56 of the valve stem 16 defines one end of an externally threaded portion 57 of the valve stem 16. A nut 58 is threaded on the threaded portion 57 of the valve stem 16 and has a beveled surface 59 adapted to be engaged by a spring-retaining washerlike member 60 which is forced thereagainst by the compression spring 21 having one end 61 thereof bearing against the retainer 60 and the other end 62 thereof bearing against the closed end wall 24 of the housing member 12.

In this manner, the compression spring 21 normally tends to move the valve stem 16 and, thus, the valve head 17 upwardly to maintain the valve seat 18 in its open condition and the valve seat 18' in its closed condition, and, thus, through the interconnection of the valve stem 16 to the flexible diaphragm 14 by the cup-shaped members 49 and 52, tends to maintain the flexible diaphragm 14 in its uppermost position as illustrated in FIG. 3.

The closed end wall 24 of the cup-shaped housing member 12 has a stepped bore 63 passing therethrough to telescopically receive a cylindrical portion 64 of the valve stem 16 and permit axial movement thereof relative to the housing member 12 between its valve opening and closing positions. However, in order to seal the chamber 43 of the device 10 from the valve seat fitting 13, one or more U-shaped flexible annular sealing members 65 are disposed in the larger portion in the stepped bore 63 as illustrated in FIG. 3 and are held in compressed relation therein by an externally threaded member 66 having its threaded portion 67 threaded into an internally threaded portion 68 of the stepped bore 63 as illustrated in FIG. 3 whereby the head 69 of the threaded member 66 abuts against an end 70 of a tubular extension 71 integrally formed on the closed end wall 24 of the housing member 12. The threaded member 66 has a bore means 72 passing therethrough to telescopically receive the cylindrical portion 64 of the valve stem 16 to permit axial movement thereof relative thereto.

The valve stem 16 and valve head 17 can be formed from a one piece molded plastic structure with the valve head 17 having a substantially frustoconically shaped ends 73 and 73 adapted to be fully and respectively received through the valve seats 18 and 18' in the manner illustrated in FIGS. 3 and 4 to center the valve head 17 relative thereto, an annular disclike portion 74 with opposed beveled surfaces being formed on the valve head 17 intermediate the portions 73 and 73' to respectively seat against the beveled valve seats 18' and 18 in the manner illustrated in FIGS. 3 and 4 to completely close the valve seats 18' and 18.

The closed end wall 24 of the housing member 12 is provided with a tubular extension 78 projecting downwardly therefrom and being internally threaded at 79 to threadedly receive a threaded portion 95 of the valve seat means 13' so that the valve seat means 13' and 13 can be readily attached to the housing member 12.

In particular, the valve seat means 13 can comprise a one piece molded plastic structure formed in the configuration illustrated in FIG. 3 wherein a tubular extension 81 is concentrically disposed about the valve seat 18 and projects upwardly therefrom to carry a threaded portion 80 for threading into a tubular extension 91 of the valve seat means 13'. In addition, the inlet passage means 19 and outlet passage means 20 are defined by outwardly directed tubular extensions 82 and 83 which are externally threaded respectively at 84 and 85 so as to be suitably coupled to an inlet conduit means and to an outlet conduit means by conventional threaded coupling members or the like.

In order to reinforce the outer rim portions 86 and 87 of the tubular extensions 82 and 83, cylindrical metal inserts 88 can be respectively disposed in the passage means 19 and 20 as illustrated. For example, the cylindrical metal inserts 88 can be molded in place when the valve seat means 13 is molded, if desired, or such metallic inserts 88 can be inserted after the valve seat means 13 has been molded.

The valve seat means or fitting 13' is also adapted to be molded as a one piece plastic structure in the same manner as the valve seat fitting 13.

As illustrated in FIG. 3, the valve seat fitting 13' has the valve seat means 18' thereof defined at the end of a tubular extension 90, which, in turn, is surrounded by another tubular extension 91 concentrically spaced therefrom and being internally threaded at 92 to be threaded to the externally threaded portion of the tubular extension 81 of the valve seat fitting 13 whereby the tubular extension 81 of the valve seat fitting 13 is telescopically received between the tubular extensions 90 and 91 of the valve seat fitting 13' as illustrated in FIG. 3.

The inlet 19' of the valve seat fitting 13' is defined by an externally threaded tubular extension 93 formed in a manner similar to the tubular extension 82 of the valve seat fitting 13 and is reinforced by the previously described cylindrical metal insert 88 for the reasons previously described.

Another tubular extension 94 extends upwardly from the valve seat fitting 13' and is externally threaded at 95 to be threaded to the threaded portion 79 of the tubular extension 79 of the housing means 12 so as to fasten the combined valve seat fittings 13' and 13 to the housing means 12.

An interior wall 96 of the valve seat fitting 13' is provided with a bore 97 passing therethrough to receive the cylindrical portion 64 of the valve stem 16 so as to permit axial movement therebetween.

Thus, by utilizing the valve seat fitting 13' of this invention in combination with the valve seat fitting 13 in the manner illustrated in FIG. 3, the pneumatically operated device 10 is adapted to switch the outlet 20 to either the inlet means 19 or the inlet means 19' depending upon the presence or absence of pneumatic pressure fluid in the chamber 15 of the device 10 in the manner previously described.

Therefore, it can be seen that the various parts of the pneumatically operated device 10 of this invention can be fabricated in a simple and economical manner by simple plastic molding operations and can be assembled together in a simple and effective manner as previously described to provide the pneumatically operated valve means which operates in the manner previously described.

Thus, not only does this invention provide an improved pneumatically operated device, but also this invention provides improved parts for such a pneumatically operated device or the like.

What I claim is:

1. A pneumatically operated valve means comprising housing means having two separate inlets and one outlet, said housing means having two spaced apart and axially aligned valve seats respectively leading from said inlets to said outlet, an axially movable valve member carried by said housing means and being disposed between said valve seats to respectively open and close the same in an alternate manner, and a pneumatically operated actuator means carried by said housing means and being operatively associated with said valve member to cause movement thereof between its operating positions, said housing means comprising two housing members detachably secured together and respectively carrying said valve seats, one of said housing members having a tubular extension projecting therefrom and coaxial with said valve seat of said one housing member, the other housing member having a tubular extension projecting therefrom and being coaxial with its said valve seat, said tubular extensions being detachably secured together, said other housing member having another tubular extension concentrically disposed within the first-named tubular extension thereof, said other tubular extension of said other housing member defining said valve seat of said other housing member at the free end thereof, said tubular extension of said one housing member being telescoped and wedged between said tubular extensions of said other housing member when said one housing member is secured to said other housing member.

2. A pneumatically operated valve means as set forth in claim 1 wherein said valve member has a valve stem extending through one of said valve seats to be operatively associated with said actuator means at the end thereof.

3. A pneumatically operated valve means as set forth in claim 1 wherein said valve member has opposed frustoconical portions for respectively seating against said valve seats in an alternating manner to close the same.

4. A pneumatically operated valve means as set forth in claim 3 wherein said valve seats respectively have frustoconical surfaces against which said frustoconical portions of said valve member seat.

5. A pneumatically operated valve means as set forth in claim 1 wherein each housing member comprises a one piece molded plastic structure.